(12) United States Patent
Giger

(10) Patent No.: US 8,298,113 B2
(45) Date of Patent: Oct. 30, 2012

(54) WIND POWER TURBINE AND GEARBOX THEREFOR

(76) Inventor: Urs Giger, Muehlau (CH)

(*) Notice: Subject to any disclaimer, the term of this patent is extended or adjusted under 35 U.S.C. 154(b) by 452 days.

(21) Appl. No.: 12/449,756

(22) PCT Filed: Jan. 29, 2008

(86) PCT No.: PCT/EP2008/000658
§ 371 (c)(1),
(2), (4) Date: Aug. 25, 2009

(87) PCT Pub. No.: WO2008/104257
PCT Pub. Date: Sep. 4, 2008

(65) Prior Publication Data
US 2010/0009803 A1    Jan. 14, 2010

(30) Foreign Application Priority Data

Feb. 27, 2007 (DE) .......................... 10 2007 009 931
Apr. 2, 2007 (DE) .......................... 10 2007 016 190

(51) Int. Cl.
*F16H 57/08* (2006.01)
*F03D 9/00* (2006.01)

(52) U.S. Cl. .......................................... 475/331; 290/55

(58) Field of Classification Search .................. 475/331; 290/55
See application file for complete search history.

(56) References Cited

U.S. PATENT DOCUMENTS

| | | | |
|---|---|---|---|
| 5,663,600 A * | 9/1997 | Baek et al. ....................... | 290/55 |
| 6,790,156 B2 * | 9/2004 | Hosle ............................ | 475/331 |
| 6,872,049 B2 * | 3/2005 | Christensen ................ | 415/124.1 |
| 7,112,157 B2 | 9/2006 | Uebbing | |
| 7,335,128 B2 * | 2/2008 | Flamang et al. .............. | 475/331 |
| 2006/0104815 A1 | 5/2006 | Siegfriedsen | |

FOREIGN PATENT DOCUMENTS

| | | |
|---|---|---|
| EP | 0 792 415 | 9/1997 |
| EP | 1 482 210 | 12/2004 |
| EP | 1 544 504 | 6/2005 |
| EP | 1 788 281 | 5/2007 |

OTHER PUBLICATIONS

International Search Report.
"Berechnung und Herstellung von Verzahnungen in Theorie und Praxis," Maag-Taschenbuch, Oct. 1985, pp. 234-237. XP-007904949 (ISR).

* cited by examiner

*Primary Examiner* — Dirk Wright

(74) *Attorney, Agent, or Firm* — Collard & Roe, P.C.

(57) ABSTRACT

The invention relates to a wind power turbine and a gearbox for same. In wind power turbines, the incoming moment is transmitted from a hub to a gearbox via a shaft, and from the gearbox to a generator. According to the invention, the gearbox is at least partially built into the shaft and/or the shaft is at least partially embodied as a rotary gearbox housing. The resulting compact construction not only renders the wind power turbine more compact and therefore significantly more economical and lighter, but in the event of a suitable design and use of a coupling gearbox, the moment generated can be transmitted in a highly secure manner.

10 Claims, 3 Drawing Sheets

WIND POWER TURBINE AND GEARBOX THEREFOR

CROSS REFERENCE TO RELATED APPLICATIONS

This application is the National Stage of PCT/EP2008/000658 filed on Jan. 29, 2008, which claims priority under 35 U.S.C. §119 of German Application No. 10 2007 009 931.4 filed on Feb. 27, 2007 and German Application No. 10 2007 016 190.7 filed on Apr. 2, 2007. The international application under PCT article 21(2) was not published in English.

The invention relates to a wind power turbine and to a gearbox for a wind power turbine.

A wind power turbine converts the kinetic energy of the wind into electrical energy and feeds it onto the grid. This is done by causing the kinetic energy generated by the wind as it flows to act on rotor blades. These latter are mounted in a hub, and the entire rotor and hub are thus caused to perform a rotary movement. The hub is connected via a shaft to a gearbox. This is generally a planetary gearbox. The rotation is then passed on to a generator which produces the electrical current.

US 2006/0104815 A1 discloses the head of a wind power turbine having a hub which, at the transition to the shaft, is mounted in such a way that the shear forces are taken up at that point. A relatively slender shaft which merely needs to be strong in torsion can therefore be used from the hub to the generator. This shaft is therefore inexpensive.

EP 1 788 281 A1 discloses a gearbox for a wind power turbine.

EP 0 792 415 B1 discloses a planetary gearbox for a wind power turbine which has, mounted in a gearbox housing, a planet gear carrier which is connected to a drive shaft which is loaded by shear forces. The drive shaft is mounted in the gearbox by means of the planet gear carrier.

EP 1 482 210 B2 proposes a gearbox having a power-adding stage which has two planetary gear trains each having a sun gear, planet gears, a ring gear and one common planet gear carrier.

The patentee of the latter patent also proposed that a coupling gearbox be built into the hub of the rotor. With the gearbox built into the hub of the rotor and with mounting in only one main rotor bearing, it is possible to achieve a considerable increase in the power density.

EP 1 544 504 A2 describes a taper rolling-element bearing for a wind power gearbox.

The object underlying the invention is to provide an improved wind power turbine.

This object is achieved by a wind power turbine having a gearbox, a torque being transmitted from a hub via a shaft to the gearbox, wherein at least part of the gearbox is arranged within a cavity in the shaft.

In conventional wind power turbines, the shaft, the gearbox and the generator are arranged in series, one behind the other, as individual components. In the event of damage occurring, this allows the components to be taken apart from one another easily to enable one or more components to be replaced. Altogether however the structure is very long and is therefore heavy and relatively expensive to manufacture.

The aspect of the invention which is presented here makes possible a considerably shorter construction for the head of a wind power turbine. Because at least part of the gearbox is arranged inside the shaft, the arrangement comprising the shaft and gearbox can be correspondingly shorter in construction.

As an alternative and as an addition to the first aspect of the invention which has been presented, what achieves the object laid down is a wind power turbine having a gearbox, a torque being transmitted from a hub, via a shaft to the gearbox, wherein the shaft is in the form of a rotating gearbox housing.

It goes without saying that in a design of this kind too at least part of the gearbox is built into the shaft radially, which likewise results in a shortening of the overall length.

This is of interest particularly in the case of wind power turbines having rated powers of 2.5 MW, 3 MW, 5 MW or more because the diameter of the gearboxes of turbines of this kind is, as a rule, more than 2 meters. The turbines are thus very large and require a correspondingly large amount of material. The materials concerned need to be of a very high grade because the torques and forces which have to be carried are very large. In prototypes and calculations for prototypes made by the inventor, the resulting shortenings were up to 1000 mm or more. Broadly speaking, savings of weight of for example 10 tonnes can be achieved in this way. Despite this, the safety factors calculated for the wind power turbine which is presented here are considerably higher than for conventional turbines.

The gearbox preferably takes the form of a multi-stage planetary gearbox, with at least one stage being arranged entirely inside the shaft. Planetary gearboxes have proved their worth for wind power turbines. They may be arranged one behind the other as a plurality of stages, an arrangement which is generally used for splitting the torque between two stages. The stages are situated one behind the other axially.

One, two or more stages may be built into the hollow shaft. The hollow shaft can then act as a ring gear for one or more stages, it being possible by means of the radial extent of the individual stages for a check to be made to see whether they make a connection to the ring gear. It is conceivable for individual stages to be so designed that they do not have any radial contact with the hollow shaft.

If the shaft has a rotating ring gear for a planetary gear train, a separate ring gear can be dispensed with. It is conceivable in this way for a set of teeth pointing radial inwards to be arranged directly on the shaft. It is also conceivable for a ring gear to be connected to the shaft to be solid in rotation with it, which means that the set of teeth forming the ring gear point radially inwards inside the hollow shaft.

It goes without saying that it is also of advantage for the shaft to be constructed to have a plurality of ring gears for a plurality of planetary gearing stages.

Regardless of whether the shaft has a rotating ring gear, it is proposed that the shaft have a planet gear carrier. As a rule, it becomes extremely costly and complicated structurally for the shaft to be formed directly in one piece as a planet gear carrier. Where a planet gear carrier which is connected to the shaft to be solid in rotation with it, it is however easily conceivable for the planet gear carrier to be one which is intended for the purpose and which leaves an appropriate amount of clear space to allow other parts of a planetary gearbox to be slid into the shaft from the open end thereof or to be fitted in some other way.

If the shaft has a rotating ring gear and a planet gear carrier, it is proposed that these be assigned to different stages which are coupled together. It has already been mentioned that a coupled gearbox gives many advantages in the wind power industry. Despite the low weight and small overall volume, a high transmission ratio is obtained. A coupled gearbox is thus particularly suitable for high-power turbines whose large, slow-turning rotors generate a high input torque. What is often opted for is a split of power between two stages. A compact solution can be designed by this means. This technique has been tested in an N60 wind turbine made by the Nordex company.

In an embodiment which is a particular preference, the gearbox has a first stage in which the shaft has a planet gear carrier while a sun gear runs indirectly to a generator, a ring gear being formed by a coupling means to a second stage in which the shaft has a ring gear, a planet gear carrier is fixed and the coupling means is in the form of a sun gear. A design of this kind defines two stages which are arranged inside the hollow shaft. For one of the two stages, the second stage in this case, the shaft acts as a ring gear. For the first stage on the other hand the shaft acts as a planet gear carrier. Coupling between the first and second stages is by means of a coupling member which in the first stage is in the form of a ring gear, but one whose outside diameter is smaller than the inside diameter of the hollow shaft and which forms the sun gear for the second stage. With a design of this kind, an advantageous, split of the power between two stages can be achieved in an extremely small amount of space. Only a few components project out of the shaft, namely the sun gear of the first stage and the planet gear carrier of the second stage. The generator can therefore be arranged very close to the rear end of the shaft.

It is proposed that an outer race of a main bearing fit round the shaft. The shaft needs a mounting and it contributes to a compact construction if the shaft passes into an outer race of a main bearing. In an ideal configuration, the outer race of the main bearing, the shaft at this point and the gearbox situated in the interior of the shaft are all situated at the same point axially.

The shaft is preferably mounted in a preloaded rolling-element bearing which is divided in two axially. A mounting of this kind can be seen for example from EP 1 544 504. The axial division in two preferably also gives a radial offset between the mounting points. It is perfectly conceivable in this way for the mounting point adjacent the hub to be of an appreciably smaller radius than the mounting point adjacent the gearbox.

A torque support is preferably connected to an outer race of a main bearing. Because an opposing torque has to be provided in opposition to the torque coming from the hub, a torque support is required. As a rule this is designed to be a flat component which is flange-mounted on the rear of the gearbox. The torque support has an arm which projects sideways radially or in some other way and is supported on the head of the wind power turbine, such for example as approximately on the azimuth mounting.

If the torque support is connected to an outer race of a main bearing to be solid in rotation with it, then this race can perform its function as a main bearing for the shaft without any further fixing. The outer race of the main bearing may for example be flange-mounted axially on the torque support facing in the direction of the hub. A one-piece design is also conceivable.

Planet gears of the planetary gearbox are preferably mounted on flexible planet gear pins. Mounting of this kind is conventionally referred to as the "flex-pin" technique. This technique was applied in the 60's to enable inaccuracies in the production of the pins to be compensated for in large companies. The inventor has appreciated that use can be made of the flex-pin technique to excellent effect precisely in the design of up-to-date wind power turbines, namely for making corrections between shafts which are constantly moving out of position due to the high forces involved and stationary components, a planetary gearbox being included in this.

It is proposed that for removal, be it for maintenance, for taking apart, for repair or for putting together, the gearbox be designed to be able to be drawn along the shaft axially. What this mainly presupposes is that over the axial extent of the gearbox the shaft is of a constant diameter relative to the gearbox or even becomes larger. What ideally corresponds to this is a gearbox which—if a plurality of gearing stages are to be arranged inside the hollow shaft—makes provision for a step-by-step taper in the shaft.

It goes without saying that it is not only a wind power turbine as a whole which is of advantage if it is designed as described above. Rather, the advantages also extend directly to a gearbox for a wind power turbine.

In this connection, it should be pointed out that what may be meant by "gearbox" in the present case is also an incomplete gearbox. The background against which this statement must be seen is that in a suitable design the hollow shaft itself may serve as part of the gearbox, namely as a ring gear for example and/or as a planet gear carrier and/or as a sun gear. If in a design of this kind mention is made on the one hand of the hollow shaft and on the other hand of the gearbox, what is to be understood by this is that the "gearbox" comprises the essential parts of the planetary gearbox except for that part which is formed by the shaft.

The invention is explained in detail below by reference to an embodiment and to the drawings. In the drawings.

Figure 3:
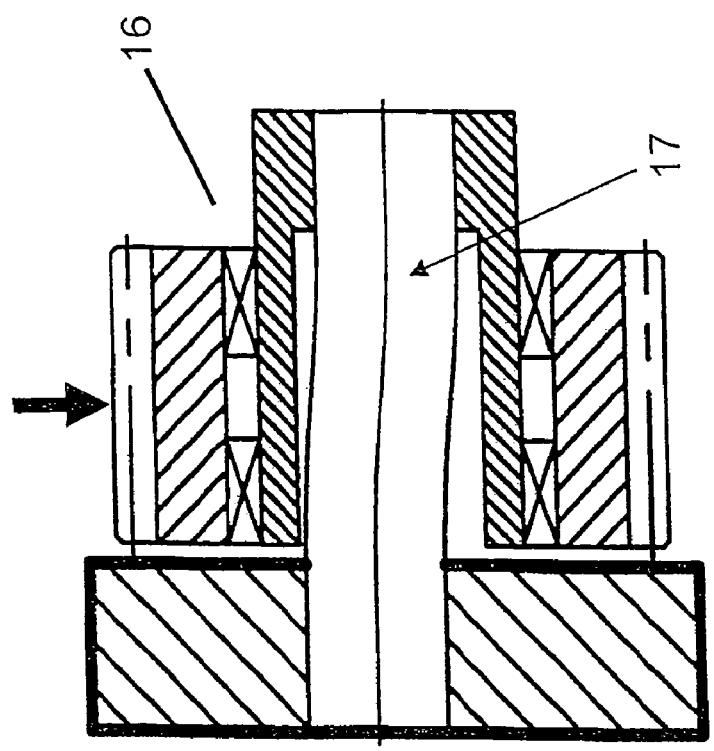
Figure 4:
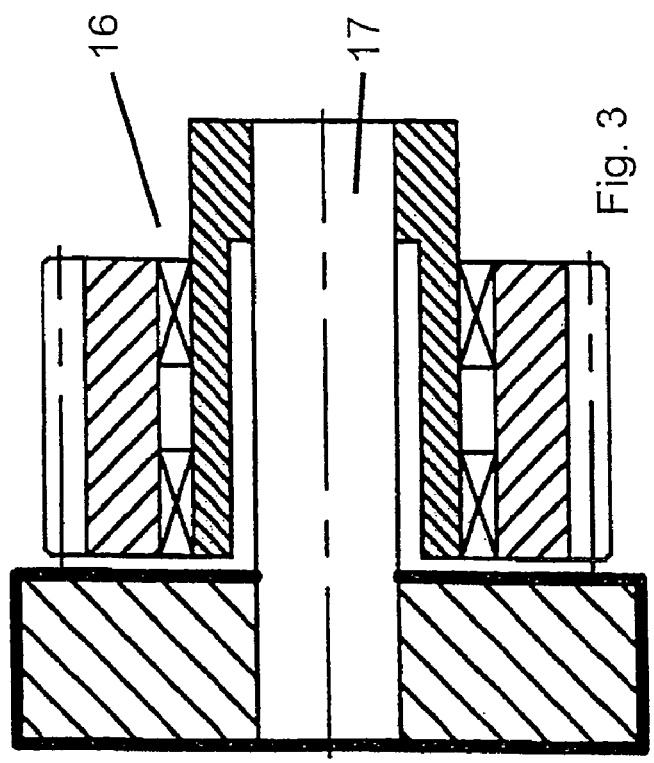

FIG. 3 shows a flex pin planet carrier in schematic longitudinal section, wherein a cup-shaped gear carrier is elastically and pivotably mounted on a flexible pin; and FIG. 4 shows the flex pin planet carrier of FIG. 3 under a vertical load, so that the flexible pin bends into an S-shape, while the cup-shaped gear carrier only shifts sidewards, its axis remaining parallel to its unloaded state, and is not tilted.

Figure 1:
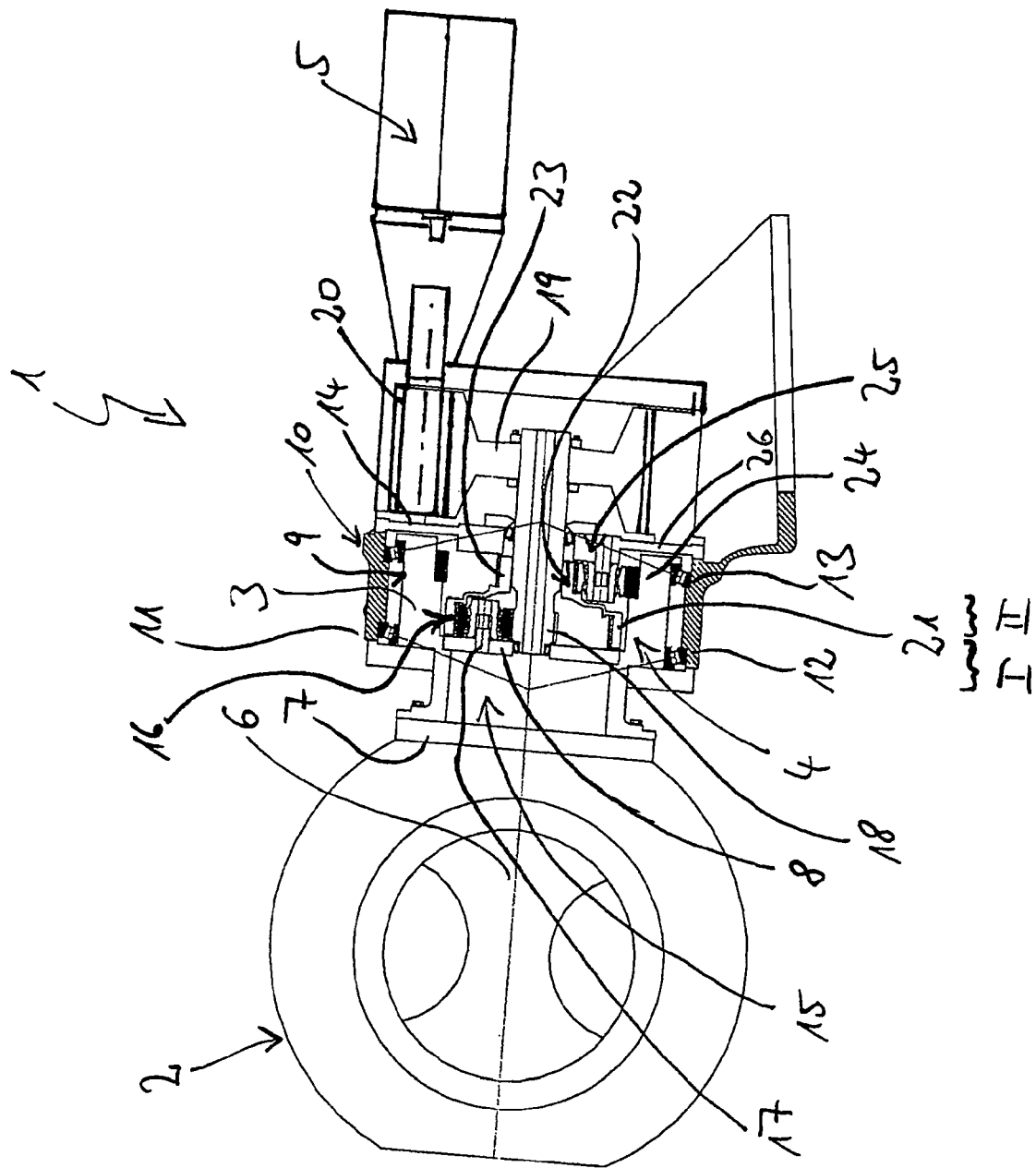
FIG. 1 is a schematic longitudinal section through a rotor hub having a shaft connected to it, having a gearbox built into the shaft and, at the end, a generator.
Figure 2:
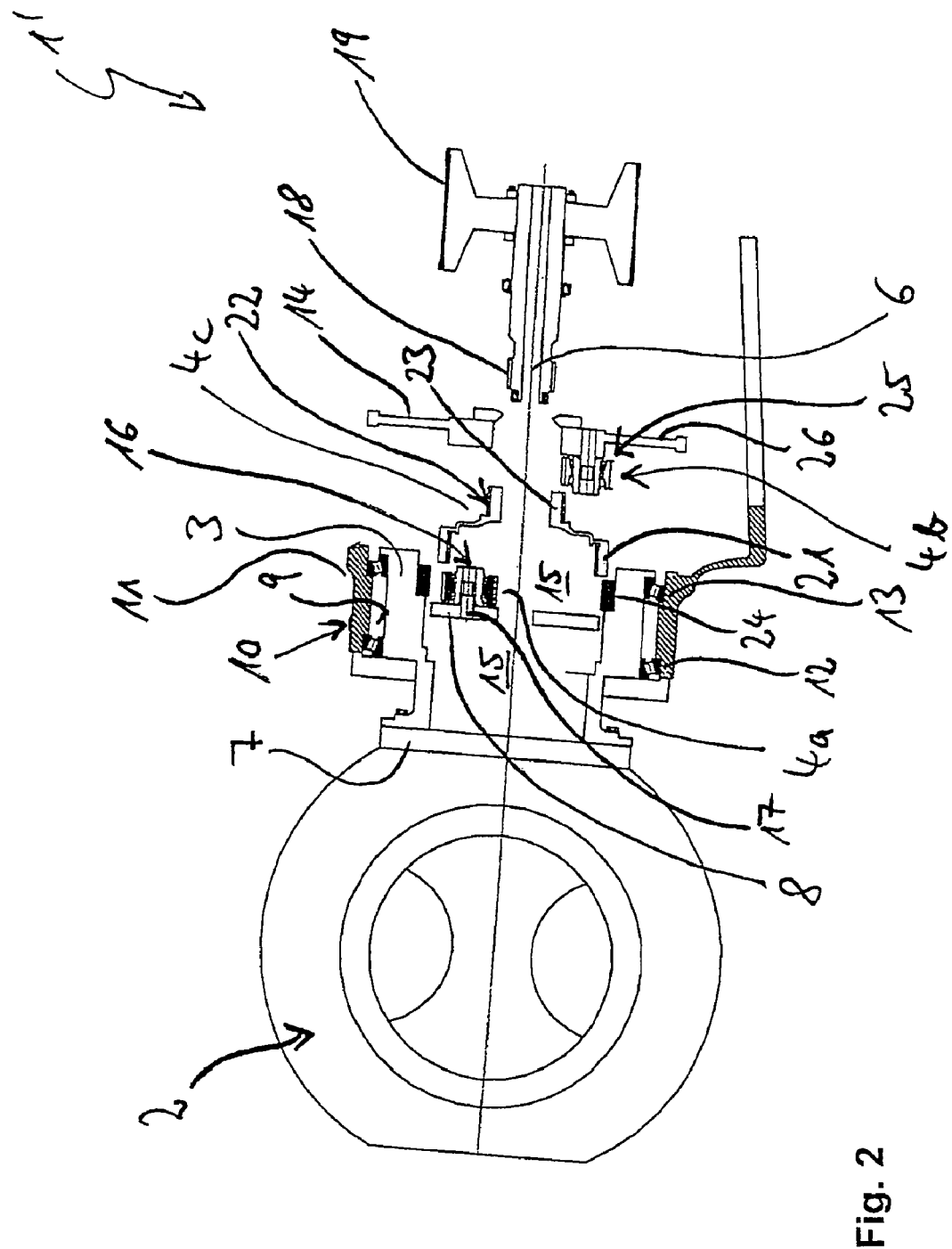
FIG. 2 shows the schematic longitudinal section of FIG. 1, wherein four construction units are shown exploded from each other, disassembled and offset along a central axis of the hub, shaft and transmission.

In FIG. 1, a wind power turbine head 1 which has been drawn to a smaller scale of FIGS. 1 and 2 and which is shown in a partly exploded state as head 1' in FIG. 2, comprises in essence the hub 2, the rotor shaft 3, the gearbox 4 (in FIG. 2 exploded to transmission parts 4a, 4b, and 4c) arranged in the latter and the generator 5 which is connected on (which is not shown in FIG. 2).

When the wind power turbine is operating, the rotors, which ensure that the hub rotates on a longitudinal axis 6 of the rotor head, are connected to the hub 2.

At the rear of the hub 2, it is flange-mounted on a shaft connecting disc 7. A torque about the longitudinal axis 6 which comes from the hub 2 is therefore transmitted undiminished to the shaft connecting disc 7.

Along the continuing path followed by the forces, from left to right in the Figure, two components are flange-mounted on the shaft connecting disc 7, namely on the one hand, on the outside radially, the rotor shaft 3 and on the other hand, further towards the inside radially, a first planet gear carrier 8.

At an outer side 9 of the shaft 3, the latter is held inside a housing 10 by a race 11 of a main bearing. Mounting is by two races of preloaded taper rolling-element bearings 12, 13.

The race 11 of the main bearing is flange-mounted to a torque support 14 in the form of a disc.

Because the shaft 3 is of a hollow form, the gearbox 4 is arranged in the interior 15 thereof.

The gearbox 4 is in the form of a planetary gearbox having two stages inside the rotor shaft 3.

In a first stage, the first planet gear carrier 8 carries a number of planet gears 16 (identified by way of example), each of these being on a flex-pin mounting. The planet gears 16 are thus mounted on planet gear mounting pins 17 (identified by way of example) which are elastically displaceable in an S-shape in a radially inward, radially outward or tangential direction.

A first sun gear 18 runs backwards out of the rotor shaft 3 co-axially to the longitudinal axis 6 and through the torque support 14. At that point it is connected via a gear 19 which is large in the radial direction to a small gear 20 for applying the torque to the generator 5.

A first ring gear 21, i.e. the ring gear of the first transmission stage I of the gearbox, is part of a coupling member 22 which constitutes the sun gear of the second transmission stage II of the gearbox, i.e. which is a second sun wheel 23. A second ring gear 24 is formed directly on the inside of the hollow shaft 3 shortly before its axial end.

A second number of planet gears 25 (identified by way of example) are mounted, each by the flex-pin technique, on a second planet gear carrier 26 which is formed directly by the torque support 14.

When the gearbox 4 is operating, the hub 2 applies a torque at an input power to the shaft connecting disc 7. This latter splits the power between the two stages: a first part travels via the shaft 3 and the second ring gear 24 into the second stage II. This latter ring gear drives the planet gear carriers 25 because the second planet gear carrier 26 is formed directly by the torque support 14, which is stationary in a fixed position. The planet gear carriers 25 therefore run on the hollow shaft 3 in the same orientation as the ring gear 24.

This drives the second sun gear 23 in the opposite direction to this direction of rotation and thus drives the coupling member 22 which runs to the first stage I.

In the first stage the coupling member 21 forms the first ring gear 16. Due to the rigid design of the coupling member 22 as a collar of two different diameters, with outside teeth being formed at the smaller diameter and inside teeth at the larger diameter, the first ring gear 16 of the first stage I of the gearbox 4 turns in the opposite direction to the direction of rotation of the hub 2. Because the first planet gear carrier 8 drives the planet gears on it in the direction of rotation of the hub 2 and with the other part of the incoming torque, the planet gears of the first stage turn in the opposite direction to the direction of rotation of the hub 2 and sum the output to the sun gear 18 and the shaft connected to it, which passes through the torque support 14.

On the further side of the torque support 14, the entire torque is transmitted at a higher speed of revolution via the large gear 19 and the small gear 20 which is connected to it and which is arranged in an eccentric position. This spur-gear stage, which has an offset, leads the entire power into the generator 5.

With a radial diameter of 2047 mm, the inventor's prototype has, for example, a length for the gearbox of just on 1239 mm while the hub 2 has an axial length of 2262 mm. The overall length measured over the hub 2, the gearbox 4 inside the shaft 3 and the generator 5 which follows is 6139 mm.

In this compact design, the tubular gearbox system is built into the rotating rotor shaft 3. The rotor shaft 3 is thus a rotating gearbox housing at the same time. The torque support 14, in the form of a disc, is bolted to the outer race 11 of the main bearing, and the generator is flange-mounted in position directly behind it. All the relative movements of the main bearing are equalled out by means of the flexible planet gear pins which employ the flex-pin technique.

Given a suitable design, a modular system is made available, based on a built-in main bearing which has a settable stiffness characteristic in the pillar after installation.

A combination of a main shaft, a main bearing, a multi-stage planetary gearbox, a torsion-limiting slipping clutch and an annular generator, concentrically installed to be of a large diameter compared with the rotor makes all this perfectly possible.

A gearbox arranged in an offset position is not necessary.

A design of this kind may result in only parts which rotate slowly being present in the arrangement as a whole, which increases the long life of the gearbox and its safety and reliability in operation. In a prototype produced by the inventor, the transmission ratio is 12.25:1 and the generator thus has an average speed of approximately 300 rpm.

The gearbox including the rotor and stator can be completely stripped out and fully or partly replaced in less than two hours.

What is more, the main components have RFID tags by which the electronic monitoring of expected life and other data is facilitated.

The built-in design of gearbox which has been presented can be used with output shafts which rotate both slowly and also quickly. When the sped is high, the generator flange is ideally bolted directly to the gearbox housing. This minimises movements by and wear on the generator.

The invention claimed is:

1. A wind power turbine having a gearbox, a hub, and a shaft having a cavity;
    wherein a torque can be transmitted from the hub via the shaft to the gearbox;
    wherein at least part of the gearbox is arranged within the cavity in the shaft so that the shaft forms a rotating gearbox housing;
    wherein the gearbox is a multi-stage planetary gearbox;
    wherein at least two stages with gear trains of the multi-stage planetary gearbox are arranged entirely inside the cavity of the shaft;
    wherein the wind power turbine further comprises a prestressed rolling-element bearing;
    wherein the shaft is mounted in the prestressed rolling-element bearing;
    wherein the prestressed rolling-element bearing is divided into two axially; and
    wherein the at least two stages of the multi-stage planetary gearbox which are arranged within the cavity in the shaft are axially arranged in-between the two prestressed rolling-element bearings.

2. The wind power turbine according to claim 1, wherein the shaft carries a rotating ring gear for a planetary gear train.

3. The wind power turbine according to claim 1, wherein the shaft comprises a planet gear carrier for a planetary gear train.

4. The wind power turbine according to claim 2, wherein the shaft has a first planet gear carrier for a planetary gear train;
    wherein the first planet gear carrier is assigned to a first stage;
    wherein the rotating ring gear is assigned to a second stage;
    wherein the first stage and the second stage are different; and
    wherein the first stage and the second stage are coupled together.

5. The wind power turbine according to claim 4, wherein the gearbox has the first stage;
   wherein, in the first stage, the shaft has the first planet gear carrier while a first sun gear is connected via a further gear train to a generator and a ring gear is formed by a coupling device;
   wherein the coupling device couples the first stage to the second stage; and
   wherein, in the second stage, the shaft has a ring gear, a second planet gear carrier is fixed, and the coupling device is a second sun gear.

6. The wind power turbine according to claim 1, further comprising a main bearing having an outer race;
   wherein the outer race fits round the shaft.

7. The wind power turbine according to claim 1, further comprising a torque support and a main bearing having an outer race;
   wherein the torque support is connected to the outer race.

8. The wind power turbine according to claim 1, further comprising planet gears and flexible planet gear pins;
   wherein the planet gears are mounted on the flexible planet gear pins.

9. The wind power turbine according to claim 1, wherein a minimum inner diameter of the gearbox is greater than a maximum outer diameter of the shaft.

10. A gearbox for a wind power turbine according to claim 1;
    wherein the gearbox can receive torque transmitted from a hub via a shaft having a cavity; and
    wherein at least cart of the gearbox can be arranged within the cavity in the shaft.

* * * * *

UNITED STATES PATENT AND TRADEMARK OFFICE
CERTIFICATE OF CORRECTION

PATENT NO. : 8,298,113 B2  Page 1 of 1
APPLICATION NO. : 12/449756
DATED : October 30, 2012
INVENTOR(S) : Giger It is certified that error appears in the above-identified patent and that said Letters Patent is hereby corrected as shown below:

In particular, in Column 8, line 12 (Claim 10) after "least," please change "cart" to correctly read:
--part--.

Signed and Sealed this
Fifteenth Day of January, 2013

David J. Kappos
*Director of the United States Patent and Trademark Office*